United States Patent [19]

Nelli et al.

[11] 4,320,105

[45] Mar. 16, 1982

[54] PELLITIZING METHOD

[75] Inventors: Joseph R. Nelli; Johnney G. Bowers; Eustace R. Conway, all of Gastonia, N.C.

[73] Assignee: Lithium Corporation of America, Gastonia, N.C.

[21] Appl. No.: 199,068

[22] Filed: Oct. 20, 1980

[51] Int. Cl.³ .......................... C01P 15/00; B01J 2/10
[52] U.S. Cl. .................. 423/421; 423/179.5; 264/117; 425/222
[58] Field of Search ..................... 264/117; 423/179.5, 423/421; 425/222

[56] References Cited

U.S. PATENT DOCUMENTS 2,803,038  8/1957  Holland et al. ...................... 264/117
3,161,707  12/1964  Stirling ................................. 264/117
4,222,727  9/1980  Adachi ................................. 264/117

FOREIGN PATENT DOCUMENTS 73250  5/1944  Czechoslovakia .

Primary Examiner—James R. Hall
Attorney, Agent, or Firm—Wallenstein, Wagner, Hattis, Strampel & Aubel

[57] ABSTRACT

A method of agglomerating materials such as lithium carbonate into pellets of a desired size utilizing water to achieve initial agglomeration of the particles comprising the materials. The initially formed pellets are subjected to drying to provide hard, easy-to-handle and package pellets, free of contaminating or unwanted binders such as starch.

7 Claims, 2 Drawing Figures

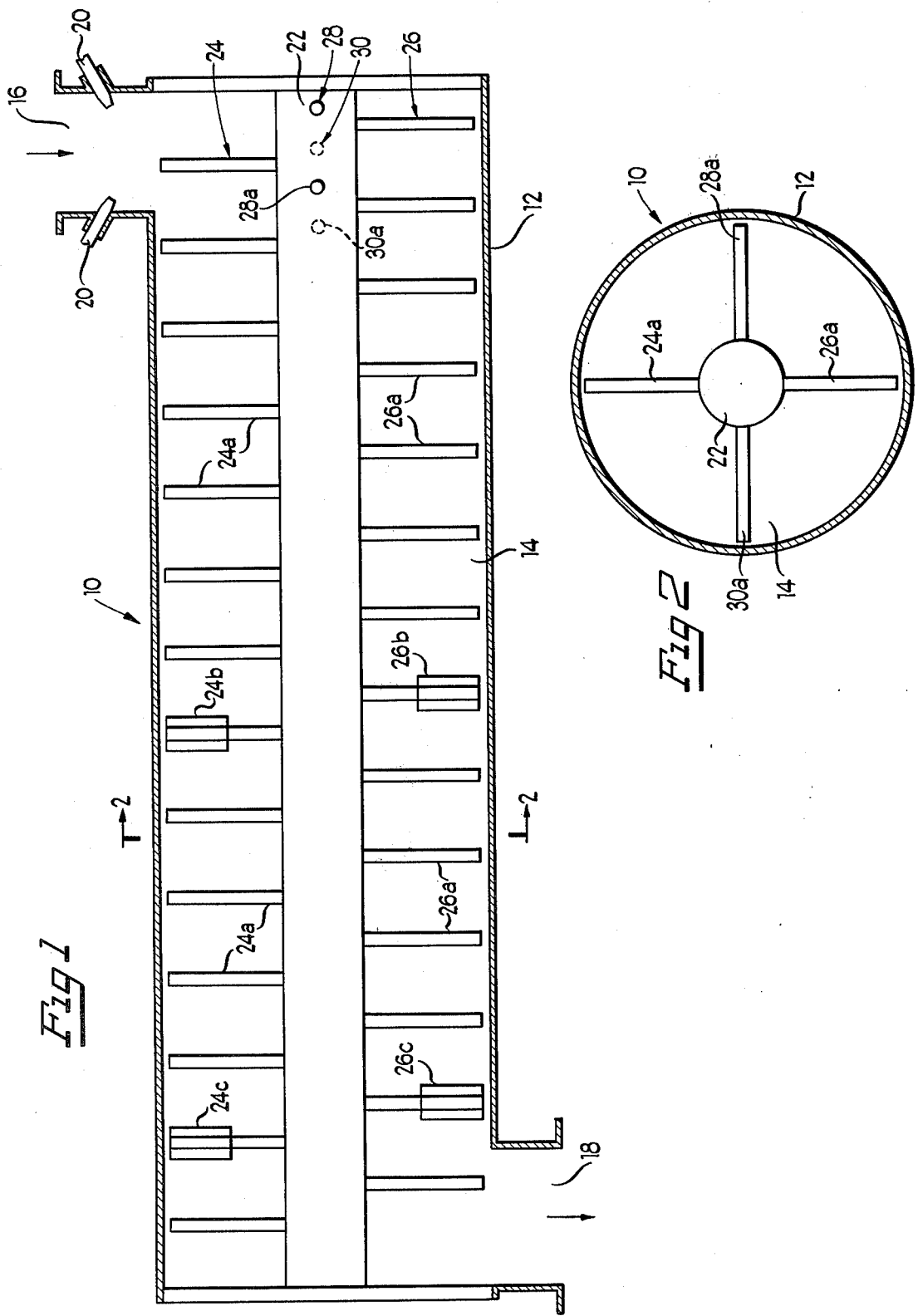

PELLITIZING METHOD

This invention relates to a method of agglomerating materials, in particular, lithium carbonate, into pellets to provide an end product of the desired size and hardness utilizing moisture or water as the only binding agent.

Heretofore, various materials, including lithium carbonate, could only successfully be formed into pellets of a desired size and hardness by utilizing upwards of 2, or more, percent, by weight, of a binder, chiefly starch. This practice, while providing the material in a form which minimizes problems such as dust formation, product loss, inefficient flow from bins and hoppers, and lower transportation qualities, normally encountered when the materials are in a non-pelletized or pulverulent form, results in an end product which still contains about 2, or more, percent by weight of an impurity, namenly, the starch, or similar type, binder. Wholly apart from the inability to obtain a pellet which is free of starch, or the like, binders, prior methods of pelletizing materials such as lithium carbonate have the added shortcoming of requiring a manufacturer to set aside floor space, and to purchase specialized equipment, for storage and use of the binder. These production disadvantages, coupled with the added raw material cost represented by the use of binders such as starch, militate against their use, and emphasize the need for a better method for pelletizing materials of the type hereunder consideration.

In accordance with the present invention, a method has been evolved for agglomerating or pelletizing materials such as lithium carbonate into pellets of a desired size and hardness which eliminates the aforementioned shortcomings and disadvantages of prior methods. The method, moreover, enables pellets to be produced in a continuous operation, at a high rate, utilizing readily available equipment.

Briefly, the method of the present invention involves the steps of introducing a material, such as lithium carbonate, in a dry, pulverulent or powder-like form, or as a moist cake, into an elongated chamber having an inlet end and n outlet end. Means advantageously is provided at the inlet end of the chamber for introducing a controlled amount of water or water vapor into the chamber to be mixed with the non-pelletized material as it enters the chamber. The chamber is further provided with rotating means, extending axially of the chamber, for maintaining the particles comprising the material to be pelletized in a constant state of turbulence withih the chamber. The particles of the material, and the water which is in a finely divided or atomized state due to the action of the rotating means, follow an orbital or spiral-like path as they move from the inlet end to the outlet end of the chamber. As they move, the particles of material and the atomized water are caused to impinge against each other thereby forming nuclei or granules. These nuclei or granules, in turn, combine or consolidate to form pellets. As the pellets continue to move toward the outlet end of the chamber, their movement is retarded to achieve densification and polishing of the pellets. After being discharged at the outlet end of the chamber, the pellets are subjected to a drying process to reduce the water content thereof to a level of less than 1% by weight, and to provide pellets of the desired size and hardness.

The foregoing, and other advantages and features of the method of the present invention will become apparent to those skilled in the art upon reference to the accompanying specification, claims and drawings, wherein:

FIG. 1 is a schematic side view in elevation, partly in section, showing an embodiment of apparatus useful in the practice of the invention; and FIG. 2 is a sectional view taken substantially along line 2—2 of FIG. 1.

The apparatus shown in FIGS. 1 and 2, and designated generally by reference numeral 10, comprises an elongated, hollow cylinder 12 which defines a chamber 14 having an inlet 16 and an outlet or discharge 18. Means, including spray nozzles 20—20 advantageously is provided at the inlet 16 of the chamber 14 for introducing a controlled amount of water into the chamber. A flow meter and control valves (not shown) desirably are associated with the nozzles 20—20 to enable close regulation of water passing into the chamber 14 to be achieved.

An elongated, axially extending, rotatable shaft 22 is provided in the chamber 14. The shaft 22, as illustrated, has two rows 24 and 26 of outwardly extending fingers or pins 24a and 26a, respectively, positioned along substantially the entire length thereof, and two short rows 28 and 30 comprising outwardly extending fingers or pins 28a and 30a, respectively, located at a right angle to the rows 24 and 26 and positioned adjacent to the inlet 16 of the chamber 14. The fingers or pins of each row 24, 26, 28 and 30 desirably have substantially the same dimensions, and are aligned in substantially equal longitudinally spaced relation to one another. The fingers or pins 24a of the row 24, however, are staggered with relation to the fingers or pins 26a of the row 26, as are the fingers or pins 28a with relation to the fingers or pins 30a. At least two of the fingers or pins 24a and 26a of the rows 24 and 26 advantageously are provided with retarding means in the form of baffles or flat paddles 24b and 24c, and 26b and 26c, respectively, secured to the upper half of the pins. Two of the baffles or paddles 24b and 26b are positioned at about the midpoint of the shaft 22 while the other two baffles or paddles 24c and 26c are located on the shaft 22 adjacent to the outlet 18 of the chamber 14. Apparatus of the type shown in the drawings is referred to in the trade as a "Turbulator" or pin mixer, and is available commerically under the tradename Ferro-Tech. The apparatus, however, requires some modification for use in connection with the method of the present invention.

In utilizing the method to pelletize a material such as lithium carbonate, the material is fed into the chamber 14 through the inlet 16. The feed rate is variable, and, in large measure, will be determined by the size of the apparatus employed. Thus, for example, with a pin mixer having a chamber approximately 30 inches long and about 12 inches in diameter, the feed rate can range from about 250 to about 350, usually about 300, pounds per hour. As the material is fed into the chamber 14, a controlled amount of water is simultaneously introduced by means of the spray nozzles 20—20 at the inlet 16 of the chamber. The quantity of water passing into the chamber from the nozzles is dependent upon the condition of the material to be pelletized. Thus, by way of illustration, when a material, such as lithium carbonate, is in a dry, pulverulent or powder-like form, water is introduced into the chamber 14 through the nozzles 20—20 at the rate of approximately 4 to 6, preferably about 5 to about 5.5, gallons per hour at a material feed rate of about 300 pounds per hour. On the other hand, when the material is fed into the chamber in the form of a moistened cake of the type obtained after centrifugation of crystallized lithium carbonate, for example, water is passed into the chamber through the nozzles at a rate of about ¼ to about 2, usually ½ to about 1, gallon per hour at approximately the same material feed rate.

The shaft 22, and its associated rows of fingers or pins are rotated at a speed of about 800 to about 1000, generally about 900, revolutions per minute. As the material to be pelletized, and the water from the nozzles 20—20, enter the inlet end of the chamber 14, the rapid movement of the fingers 24a, 26a, 28a and 30a on the shaft 22 acts to bring about atomization of the water, with the result that the particles comprising the solid material to be pelletized and the particles of water are brought into intimate contact thereby causing at leat initial agglomeration of the solid material particles. The added number of fingers or pins at the inlet 16 of the chamber, as represented by the rows 28 and 30, serve, in cooperation with the fingers or pins 24a and 26a of the rows 24 and 26 positioned at the inlet 16, to move the particles in the direction of the outlet 18 of the chamber and to prevent any clogging of material at the inlet.

The mechanical and aerodynamic action of the fingers or pins maintain the initially agglomerated particles in a highly turbulent state as they are swirled about in the chamber, and as the particles travel in a somewhat spiral-like path in the direction of the outlet of the chamber, further agglomeration of the particles occurs. The small granules thus formed eventually grow into spheroidal-like pellets of fairly uniform size and density. As these pellets approach the approximate midpoint of their travel along the longitudinal axis of the chamber, the first pair of baffles or paddles 24b and 26b act to retard or delay both the circular and linear movement of the pellets. This results in a further increase in pellet size and contributes to pellet densification. As the formed pellets continue to move toward the outlet 18 of the chamber, they are work-hardened, densified and polished. This action is aided and prolonged by the retarding effect of the last pair of baffles or paddles 24c and 26c.

When the formed pellets have reached the outlet 18 of the chamber, they will have accumulated enough mass to enable them to resist the aerodynamic forces created in the chamber by the rotating shaft and its associated fingers or pins, and will, as a result, pass out of the chamber through the outlet 18. The dwell time or residence time of the material in the chamber from the point of its introduction to its discharge is somewhat variable. In the case of a pin mixer having the dimensions mentioned above, and at a fee rate of the order of 300 pounds per hour, employing a shaft speed of about 900 RPM, the residence time in the chamber of a material such as lithium carbonate will be about 1 to 2 minutes, usually 1.5 minutes.

The formed pellets discharged from the chamber through the outlet 18 will have a water content ranging from about 10% to 20%, usually about 14% to about 16%, by weight. The pellets are then subjected to a drying operation to reduce the water content of the pellets to a level of the order of about 0.3% to about 1%, preferably about 0.4% to 0.6%, by weight of the pellets. Drying can be carried out with conventional drying apparatus at temperatures in the range of about 300° F. to about 400° F., usually at about 350° F. Exemplary of apparatus which can be employed for this purpose is a rotary tray drier sold by Wyssmont Company, Inc. The mesh size of the dried pellets can vary. Generally speaking, in the case of a material such as lithium carbonate, the mesh size of the dried pellets desirably will be in the range of about −4 to about 30, preferably about 15 to about 20. The dried pellets are dust-free and capable of withstanding the roughest handling during packaging and shipping. The high active material content of the pellets enables them to be used directly in many operations without the need for removing contaminating binders such as starch.

Materials other than lithium carbonate which can be pelletized by the method of the present invention include lithium fluoride, lithium tetraborate, calcium carbonate, calcium fluoride, potassium bitartrate, and strontium carbonate, to mention a few.

While the invention has been described with relation to particular materials and apparatus, it will be apparent to those skilled in the art that variations and modifications of this invention can be made and that equivalents can be substituted without departaing from the principles and scope of the invention.

What is claimed is:

1. A method of forming pulverulent, powder, or powder-like materials into pellets comprising: introducing a pulverulent material into an elongated chamber having an inlet and an outlet, said chamber being provided with a rotatable shaft positioned along the longitudinal axis thereof, said shaft being provided with a plurality of spaced, outwardly extending fingers along its length, the number of said fingers on the shaft being greater at the inlet of the chamber than at the outlet thereof, at least two of the fingers located between the inlet and the outlet of the chamber having retarding means thereon for impeding the movement of the material in the chamber, contacting the pulverulent material with water as it is introduced into the chamber, rotating said shaft at a rate sufficient to maintain the pulverulent material in a turbulent state and to atomize the water introduced into the chamber to initiate agglomeration of the pulverulent material, moving the initially agglomerated material along the chamber in the direction of the outlet thereof while continuing to maintain the initially agglomerated pulverulent material in a turbulent state to bring about further agglomeration of the pulverulent material, impeding the movement of the agglomerated material with the retarding means on said at least two fingers located between the inlet and the outlet of the chamber to effect further agglomeration of the material into pellets and to bring about densification of the pellets, discharging the formed pellets at the outlet of the chamber, and subjecting the pellets to heat to reduce the water content thereof.

2. A method according to claim 1 wherein the movement of the agglomerated material in the direction of the outlet of the chamber is impeded by at least two fingers having retarding means thereon at a point approximately midway between the inlet and the outlet of the chamber and by at least two other fingers having retarding means thereon located on said shaft adjacent to the outlet of the chamber to bring about an increase in size and densification of the agglomerated material.

3. A method according to claim 1 wherein said at least two fingers on the shaft are provided with flattened blades on the ends thereof to impede the movement of the agglomerated material in the chamber.

4. A method according to claim 1 wherein the material to be pelletized is lithium carbonate.

5. A method according to claim 1 wherein the pulverulent material is introduced into the chamber in a partially moistened form, and the amount of water introduced into the chamber is reduced in proportion to the amount of moisture in the partially moistened pulverulent material.

6. Lithium carbonate in pelletized form produced in accordance with the method of claim 1, the lithium carbonate pellets having a water content of less than 1% by weight, and a mesh size in the range of about −4 to about 30.

7. A method according to claim 1 wherein the pulverulent material is contacted with water by means of spray nozzles located at the inlet of the chamber, and the shaft is rotated at a speed of about 800 to about 1000 revolutions per minute.

* * * * *